*INVENTOR.*
JOHN M. SLATER

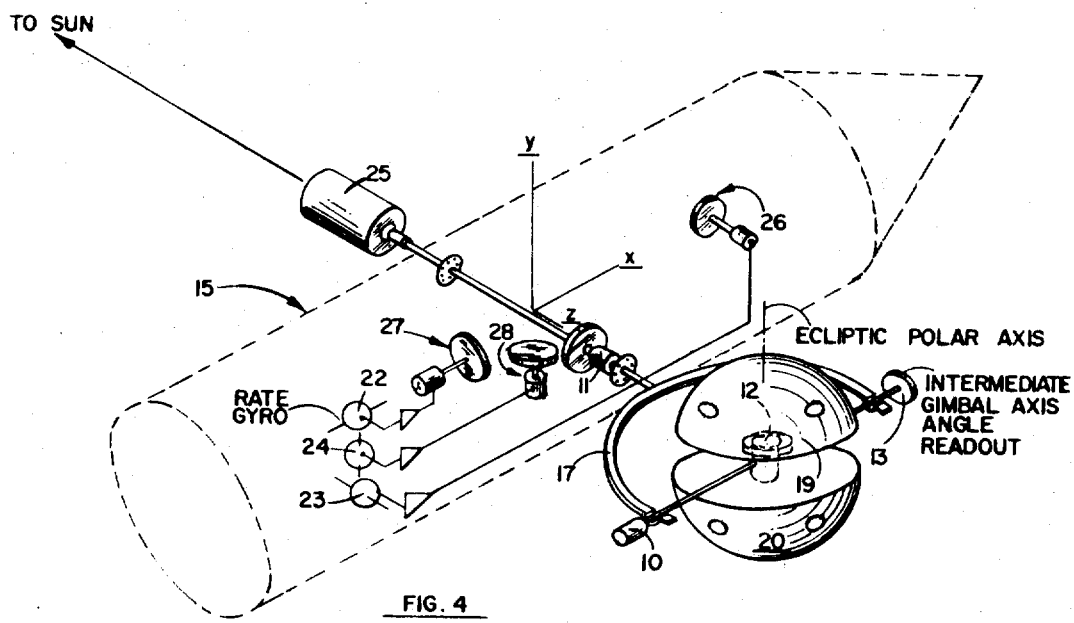
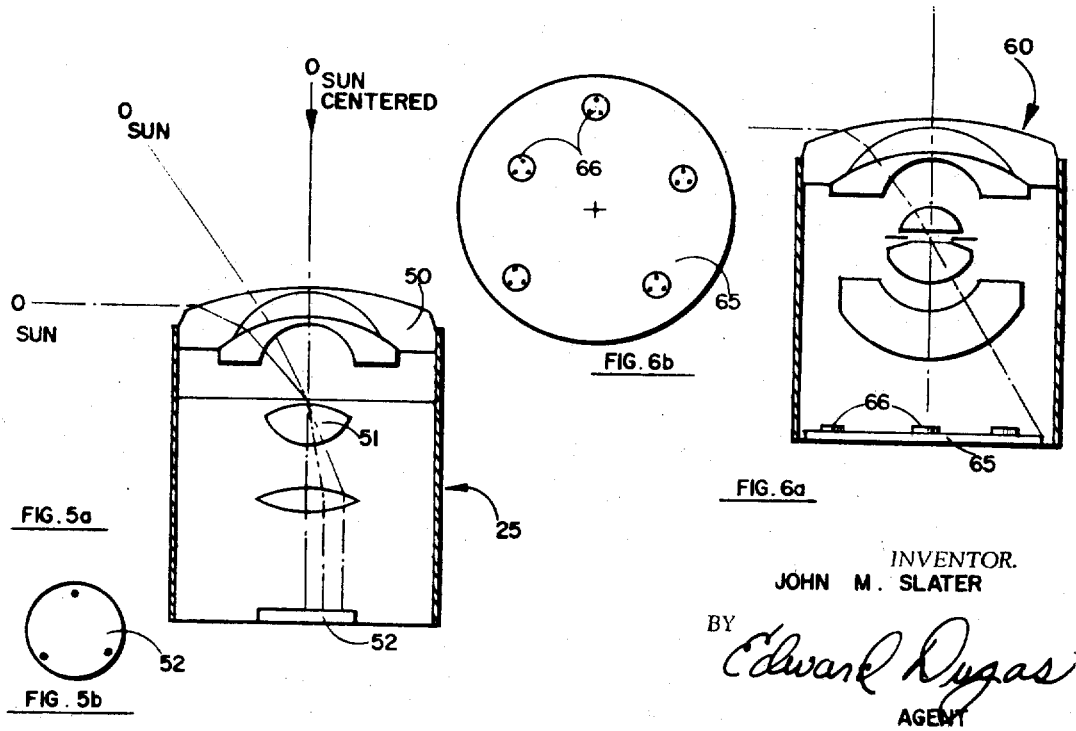

United States Patent Office 3,448,272
Patented June 3, 1969

3,448,272
OPTICAL REFERENCE APPARATUS UTILIZING A CLUSTER OF TELESCOPES AIMED AT A SELECTED GROUP OF STARS
John M. Slater, Fullerton, Calif., assignor to North American Rockwell Corporation, a corporation of Delaware
Filed Oct. 23, 1965, Ser. No. 503,936
Int. Cl. G01j 1/20
U.S. Cl. 250—203                                    5 Claims

ABSTRACT OF THE DISCLOSURE

Optical means for establishing and continuously maintaining a three-axis space reference in a craft for any attitude of the craft relative to the stellar sphere in which a gimbaled, cluster of telescopes is aimed at a selected group of stars, spaced all over the sky, such that at least two of the stars are visible in any orientation of the craft. A null type servosystem keeps the cluster aligned with the stars.

---

This invention relates to an optical apparatus for establishing and continuously maintaining a three-axis space reference in a craft, in any arbitrary attitude of the craft, by purely optical means operating on a preselected set of stars distributed throughout the sky.

For many purposes in the guidance and attitude control of space craft it is desirable to establish and maintain at all times a three-axis inertial-space reference despite unrestricted changes in the attitude of the craft relative to the stellar sphere. This can be accomplished with the aid of a set of gyros, either arranged to stabilize a gimbaled platform or mounted directly on the craft to sense rotation thereof relative to inertial space. However, gyros introduce problems of undesirably high power consumption, imperfect reliability, and need for temperature regulation. In any event, auxiliary equipment is required which makes direct reference to the stars or other celestial bodies, to correct the inevitable drift of the gyros.

It is therefore very desirable to have an apparatus that provides a continuous coordinate reference without using gyroscopes.

In the present invention a cluster of telescopic objectives is provided, gimbaled for angular freedom relative to the craft, and having an angular relation in accordance with the mean positions of a selected set of stars distributed throughout the sky, such that in one unique orientation each telescope objective is pointed at its selected star to provide a three-axis space reference. The set of stars upon which the telescope objectives are aligned are picked in such a manner that there is only one such group that will fall within the field of view of the telescope objectives. This particular feature allows for rapid and unambiguous star acquisition from any arbitrary initial attitude of the space craft. The group of stars is selected so that at least two, and ordinarily four or five, will be visible at their telescope objectives in any craft attitude, the remainder being hidden by the craft or parts thereof. Continuity of the reference is thereby guaranteed.

It is therefore an object of the present invention to provide a three-axis space reference using an optical apparatus without the use of gyroscopes.

Another object of the present invention is to provide a three-axis space reference which utilizes the position of a selected set of stars which selected set is the same for any attitude, orbit, or mission within the solar system.

Figure 1:
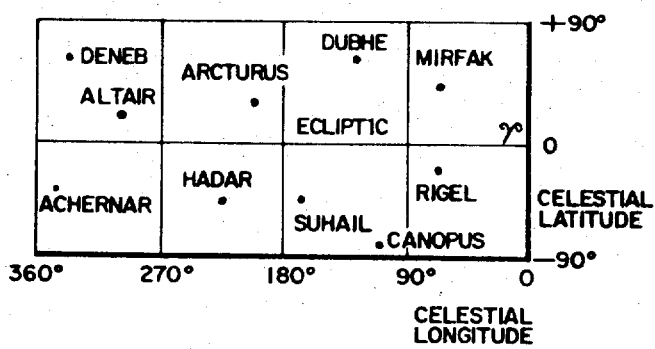
Figure 2:
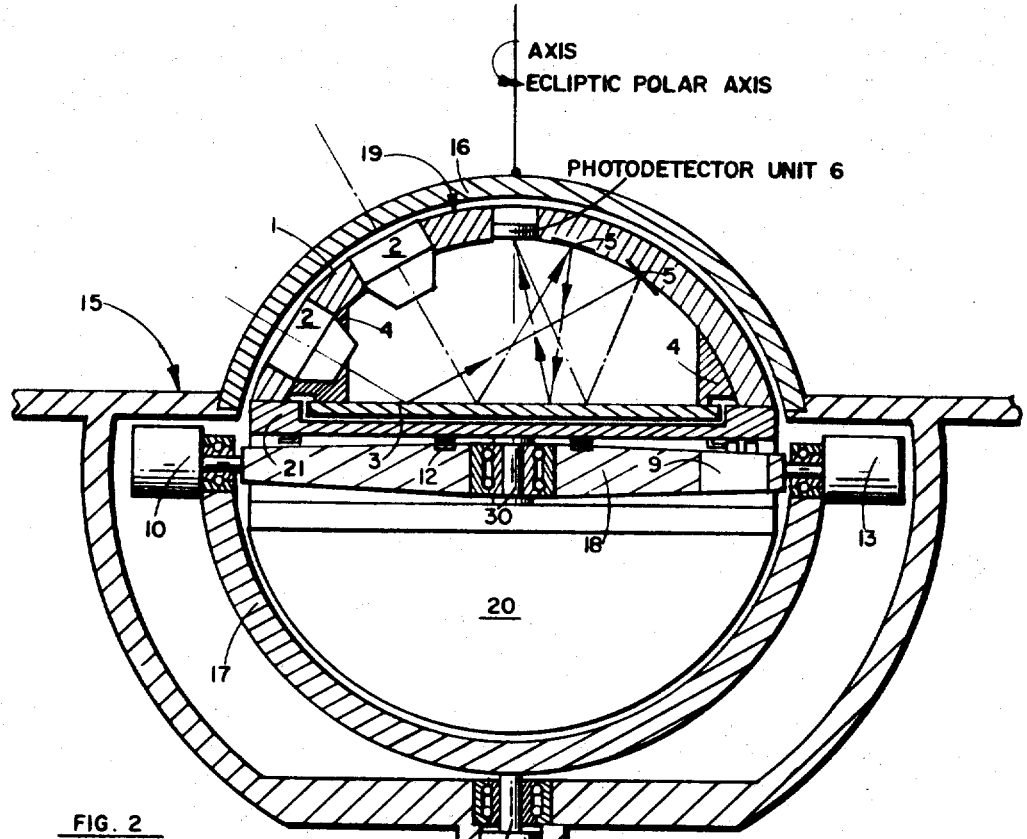
Figures 3A, 3B:
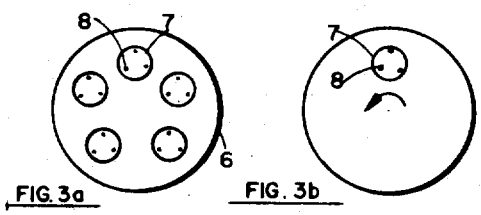
Figure 7:
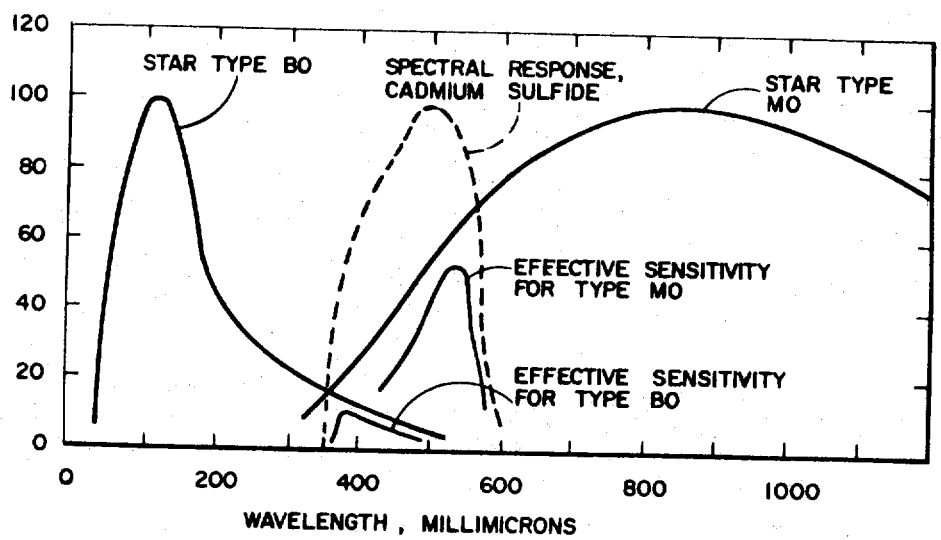

These and other objects of the present invention will become more apparent and will be best understood by reference to the following description and the accompanying drawings, wherein:

FIG. 1 is a chart of a typical selected star set;
FIG. 2 illustrates one embodiment of the invention;
FIGS. 3a and 3b illustrate two star image detectors which may be employed in the invention;
FIG. 4 illustrates the optical apparatus and its relationship to the space craft;
FIGS. 5a and 5b illustrate one possible configuration of a telescope and detector, respectively, which may be employed in the invention;
FIGS. 6a and 6b illustrate another configuration of a telescope and detectors, respectively, which may be employed in the invention; and
FIG. 7 is a chart illustrating the energy distribution of various stars.

The system of the invention makes use of a set of stars, which are spaced approximately uniformly and which are preferably located well away from the ecliptic (plane of the earth's orbit), so that no confusion can arise with the sun, moon and bright planets, the real and apparent motions of which are confined to a narrow zone about the ecliptic (±8° as seen from the earth). FIG. 1 shows a representative set of stars, none closer than about 30° to the ecliptic, and so located that several will be present in a hemispherical field of view oriented anywhere in the sky. The set of stars shown is merely illustrative; and other sets exist which consist of isolated stars that are fairly uniformly spaced and located well away from the ecliptic, or in other words, having a celestial latitude of at least ±15°.

In accordance with the invention, a cluster of telescopic objectives is provided, angularly related in accordance with the mean positions of the selected stars, so that in one unique orientation each telescope is pointed at its star.

A telescope assembly to accommodate the set of stars can consist of a cluster of separate and independent units of conventional type mounted in fixed relation to each other. However, it would ordinarily be preferred to make the assembly either in a single block, or in two blocks in case an internal gimbal support is to be used. Referring to FIG. 2, a telescope block 19 is shown comprised of a hemispherical dome-like member 1 to which objectives 2, reflecting surfaces 3 and 5, and a set of photodetectors 6 are attached. Dome member 1 is supported by a base member 21. The axis of symmetry of member 1 is parallel to the polar axis of the ecliptic, when the system is in operation. The construction shown, based on objectives of refractive type, is ordinarily not desirable in conventional star tracking equipment where a single telescope must accommodate stars of widely differing spectral characteristics and a difficult problem of color correction arises. However, in the present case matters are simplified because each objective is designed for use only with one star of particular spectral characteristics. To illustrate, FIG. 7 shows the spectral energy distributions for stars of type BO (blue) and MO (red), and the spectral response function for a typical cadmium sulphide photodetector. The effective sensitivity of the photodetector for the two types of stars is as indicated, the maxima occurring at about wavelength 390 and 540 millimicrons, respectively. The lens system for the first star would be corrected for zero chromatic aberrations at 390 millimicrons, and for the second star at 540 millimicrons.

A telescope block 20 is identical to block 19 and is therefore shown only in outline form and not in detail. A gimbal member 18 is used to symmetrically mount blocks 19 and 20, via base member 21 and shaft 30, with two degrees of angular freedom with respect to a gimbal member 17. Gimbal member 17 mounts gimbal member 18 to a craft 15 with a singular degree-of-freedom via a shaft 29.

The transparent dome-like member 16 is attached to space craft 15 and provides the telescopes with a window through which they may sight to the stars along with physical protection. (In some cases the dome may be omitted entirely, the telescope assembly being operated in the vacuum of space.)

Objectives 2 are preferably of the telephoto type (positive front lens with negative lens behind it at a substantial distance) to obtain a long local length without unduly increasing the size of the apparatus.

A front-surfaced mirror 3 is supported at the base of the dome by webs 4 which extend downward between adjacent objectives. Mirror 3 reflects the light from each objective to a properly positioned small mirror 5, which reflects the light back down to mirror 3 and thence to photodetector assembly 6. Various types of light baffles may be used to prevent the overlapping of light images on the photodetector and telescopic objectives. The use and construction of such baffles is well known to those persons skilled-in-the-art.

Various kinds and arrangements of photodetectors can be used provided they meet these specifications: (1) the detector should afford a substantial field of acquisition, say of the order of 0.5° diameter (size of the sun or moon), meaning that a bright star anywhere in such a field off the axis should yield a signal indicative of direction and magnitude of off-axis conditions; (2) the detector should yield an error signal which is linear with displacement of the star image from center over a small range—about half a minute of arc—to facilitate correction for aberration of light as will be described. Furthermore, it is desirable, though not essential, that the detector be of a design not requiring moving parts for its operation.

One kind of detector meeting these specifications is disclosed in U.S. patent application, Ser. No. 488,485, entitled, "Semiconductor Device," by N. G. Dillman.

Referring now to FIG. 3a, detector 6 includes a discoid cadmium sulphide element 7 with suitably energized, spaced electrodes 8, and processing circuits (not shown) such as to yield a signal very nearly proportional to displacement from null in a Cartesian coordinate system with origin at null.

Assuming five stars per hemisphere, there will be provided in each detector unit five units of the Dillman type, disposed so that their nulls coincide with the mean positions of the five star images.

The photodector signals are amplified, by appropriate electronics which is not shown but is well known to those persons skilled in the art, and fed through appropriate resolvers to gimbal servomotors 9, 10, and 11, so that upon the occurrence of an error signal, the gimbal servo system is activated to adjust the gimbaled telescope assembly in a sense to reduce the error.

Alternatively, a single photodetector can be used, rotatably mounted so as to expose it successively to the star images. See FIG. 3b. The speed of rotation of the photodetector is made fast enough, e.g., a few r.p.s., so that the gimbaled assembly cannot drift off any appreciable amount while control is being passed from one star to another.

Because of aberration of light, the telescopes in general cannot achieve a null on more than one star. Aberration resulting from the earth's motion in its orbit causes the apparent position of a star to be displaced from the mean position on a locus which is an ellipse, the magnitude of whose semimajor axis is 20 sec. of arc and of semiminor axis depending upon the distance of the star from the pole of the ecliptic. Aberration due to the craft's orbital motion, which is of the order of one-fourth this amount (the speed of an earth-grazing satellite is about 8 km./sec., which is about one-fourth the orbital speed of the earth: 29.8 km./sec.), for close orbits, is vectorially added to the first term.

The magnitude and direction of aberration is known exactly, so far as the earth's orbital motion is concerned, as a function of star position and time of year, and approximately, for the vehicle orbital motion, to the degree of accuracy with which the orbital elements are known. In accordance with the invention, the outputs of the photodetectors may be biased for the components of aberration due to earth's orbital motion. In many types of missions this is sufficient; the error, at most about five seconds or arc, due to craft orbital motion, being negligible. If correction is required, a rough computation using available data on the craft's orbital elements, is sufficient to reduce error from such source below a second of arc.

Angle readouts 12, 13 and 14 are provided at the inner, intermediate and outer gimbal axes. These readouts can be of any suitable known type. For example, the readout described in U.S. Patent No. 3,096,444, entitled, "Electromechanical Transducing System," by H. H. Seward, is capable of reading out angles to the required accuracy, the tolerance typically being from a few seconds of arc to a few minutes of arc.

The apparatus of this invention may be used in conjunction with other optical apparatus for determining the direction to the sun or to the center of the planet or satellite about which the craft is orbiting. By comparing the direction of such a body, with the directions of two or more stars as established by the present invention, a navigational position fix can be made in terms of some selected astronomical coordinate ssytem. Such auxiliary apparatus is not in itself a part of the subject matter of the present invention, but a representative example will be given to illustrate the manner of use, and also how stars are initially acquired by the present apparatus. For simplicity, it is assumed that craft 15 is orbiting the earth.

Reference is made to FIGS. 4, 5a and 5b. A sun-tracking telescope 25 is provided on outer gimbal member 17, including an objective of inverted telephoto type (outer negative lenses 50 spaced from an inner positive lens 51) so as to include a substantially hemispherical object field. A suitable objective of this type is described in detail in K. Miyamoto, Fish Eye Lens, J. Optical Soc. America, 54, No. 8, August 1964, p. 1060. In the focal plane of the telescope is located a large Dillman-type photodetector element 52, so that in the centered condition, the outputs from the electrodes are equal, whereas an off-centered condition is indicated by inequality of signals. The photodetector signals are applied to a servo system of known type operating reaction rotors 26, 27 and 28 (FIG. 4) or equivalent attitude-changing devices in a sense to adjust the craft attitude in roll (i.e., about the $x$ axis) and yaw (i.e., about the $y$ axis) until the sun image is centered and stays centered.

Assume craft 15 to be in any arbitrary attitude and attitude rate. First, attitude rate is brought to zero as by servo-controlling reaction rotors from frame-fixed rate gyros 22, 23 and 24 until the rate gyro signals go to zero, the craft then being substantially irrotational in inertial space. Second, the craft is maneuvered to seek the sun. Inasmuch as the sun-tracker telescope field is a hemisphere, a slow command roll will bring the sun into the field. Control of the attitude-changing devices is then transferred to solar telescope photodetector 52 as described. When equilibrium is established the $x$ and $y$ axes will be normal to the solar radius vector, but may have any arbitrary orientation about the vector direction, i.e., about the $z$ axis.

The star tracker assembly, elements 19 and 20, are caged about the intermediate and outer gimbal axes and at the inner axis, angle readout 12 is set for the heliocentric longitude of the earth for the particular time of year, such longitude being zero at the instant of the autumnal equinox (about Sept. 22) and running through 360° in the course of a year from that date.

The craft is now caused to rotate slowly about the $z$ axis, turning the caged star tracker assembly with it.

When the intermediate gimbal axis attains parallelism with the plane of the ecliptic, the selected stars will appear simultaneously in the fields of the telescopes. Control of the gimbals is now transferred to the star tracker photodetectors as described. There is practically no possibility of ambiguity; at any position there is only one set for four or five bright stars which can appear on-axis simultaneously.

Celestial longitude can now be read off inner gimbal axis angle readout 12 and celestial latitude (which in the example will be very close to zero) can be read off intermediate gimbal axis angle readout 13.

The apparatus of the invention may be used in conjunction with earth horizon sensors, for example those described in U.S. Patent No. 3,162,764, entitled, "Space Vehicle Attitude Control," by R. P. Haviland, or U.S. Patents No. 3,119,018 and No. 3,156, 823, entitled "Horizon Sensor System" and "Horizon Sensor With Reflective Optics," respectively, by R. W. Asthmeier et al. The angle readouts of the present apparatus yield the orientation of the craft frame relative to the celestial sphere (as defined by stars) and the earth horizon sensors yield the orientation of the craft frame relative to the line from the center of the earth (approximately).

The use of separate optical channels, defined by a plurality of objectives and reflectors, as described in connection with FIG. 2, is advantageous from the point of view of maximizing focal length, and hence pointing accuracy, and also in bringing the images close together for application to the photodetectors. However, a pair of wide-angle cameras can be substituted. Such an arrangement is cheaper to make and adjust and is quite adequate in accuracy for a great many space guidance applications, a tolerance of one or two minutes of arc being readily attainable, and even greater accuracy by suitable care in design, assembly and adjustment.

Various kinds of optical systems are known, which will include a field up to a hemisphere with adequate definition. Fore the sake of illustration one such system, adapted from U.S. Patent No. 3,170,025, entitled "Opticay System for Panoramic Photographing," by Y. Ino, is shown in FIGS. 6a and 6b as element 60 and is used in conjunction with a set of photodetectors 66 mounted to a base 65 located at the proper positions for the selected stars. An oppositely directed pair of such cameras, suitably gimbaled, takes the place of the multiple-objective system of FIG. 2. Using cadmium sulphide photodetectors, and a set of bright stars such as those indicated in FIG. 1, an objective aperture of the order of 25 to 30 mm., and focal length 200 mm., is practical.

In such a system it is practical to make use of a considerably larger number of stars than in the apparatus of FIG. 2, with enhancement in accuracy over that of any single star measurement, by averaging the errors associated with the directional measurement of any one star.

While the invention has been described in connection with specific apparatus, it is to be clearly understood that this description is made only by way of example and not as a limitation to the scope of the applicant's invention.

What is claimed is:

1. An apparatus for establishing and continuously maintaining a three-axis stabilized reference for a space craft for any attitude of said space craft relative to the stellar sphere comprising, in combination:
   a telescope block means;
   gimbal means mounting said telescope block means to said space craft with three degrees of freedom;
   a plurality of telescopic objectives positioned on said telescope block means and having an angular relation in accordance with the means positions of a selected group of stars, said stars being distributed over the entire sky and in sufficient number that at least two of them will be visible in two of said telescopic objectives in any attitude of said craft;
   detector means for detecting the images of said selected group of stars from said telescopic objectives and for providing error signals when said star images deviate from said mean position, said telescope block means comprising a hemispherical member having a single mirror for reflecting the images from said telescope up towards the apex of said hemispherical member and a plurality of mirrors mounted so as to reflect the reflected images back down to the single mirror and thence upwards to a small region near the apex of said hemispherical member, said detector means being positioned at said small region near said apex; and
   a servo system responsive to said error signals for controlling said gimbal means so as to reposition said telescope block means to decrease said error signals.

2. The apparatus of claim 1 wherein said telescope block means is comprised of a pair of hemispherical members each having said plurality of said telescopic objectives positioned so as to detect the mean position of a different selected group of stars.

3. An apparatus for establishing and continuously maintaining a three-axis stabilized reference for a space craft in the presence of unlimited freedom in attitude of said craft, comprising, in combination:
   means for forming optical images of a selected group of stars distributed over a major portion of the celestial sphere, said means comprising a pair of hemispherical units, each comprising a rigid dome-like member having a plurality of telescope objectives fixed thereon, a single mirror for reflecting the telescope images toward the apex of said dome, and a plurality of mirrors for reflecting the reflected images back down to the single mirror and thence upward to a small region near the dome apex;
   gimbal means for mounting said image forming means for three degrees of freedom relative to said craft, said gimbal means arranged so that at least two of said selected stars are imaged for any given attitude of said craft;
   detector means responsive to said image forming means for providing error signals indicative of the displacement of said stars from a reference position, said detector means being positioned at said small region near said apex; and
   servo means resposnive to said error signals for controlling said gimbal means so as to reduce said error signals.

4. The apparatus of claim 3 wherein the innermost axis of said gimbal means is so disposed relative to said image forming means, that said axis is parallel to the ecliptic polar axis when said selected group of stars are substantially in said reference position.

5. An apparatus for establishing and continuously maintaining a three-axis stabilized reference for a space craft during any and all attitude changes of the space craft, comprising, in combination:
   telescope block means provided with a plurality of mutually fixed optical image forming means so oriented that the sensing axes of said image forming means are directed towards the mean positions of a plurality of selected stars distributed over a major portion of the sky;
   gimbal means for mounting said block means for three degrees of freedom relative to said craft, said gimbal means arranged so that at least two of said selected stars are imaged in any arbitrary attitude of said craft;
   detector means positioned to senes the images provided by said image forming means for providing error signals when said star images deviate from said mean positions, said telescope block means comprising a hemispherical member having a single mirror for reflecting the images from said optical image forming means towards the apex of said hemispherical member and a plurality of mirrors mounted so as to reflect the reflected images back down to the single mirror and thence upward to a small region near the apex of said hemispherical member, said detector means being positioned on said small region near said apex; and servo means responsive to said error signals for controlling said gimbal means so as to reposition said telescope block means to decrease said error signals.

References Cited

UNITED STATES PATENTS 2,930,545 3/1960 Houle et al. _____ 250—203 X
3,162,764 12/1964 Haviland _____ 250—203 X
3,230,377 1/1966 Smith _____ 250—203
3,263,088 7/1966 Goldfischer _____ 33—61 X RALPH G. NILSON, *Primary Examiner.*

T. N. GRIGSBY, *Assistant Examiner.*

U.S. Cl. X.R.

33—61; 88—1; 244—1; 250—211